United States Patent [19]
Patterson

[11] Patent Number: 5,435,267
[45] Date of Patent: Jul. 25, 1995

[54] LIVESTOCK FEEDER

[75] Inventor: Roger L. Patterson, Selkirk, Canada

[73] Assignee: Westland Plastics, Ltd., Winnipeg, Canada

[21] Appl. No.: 172,638

[22] Filed: Dec. 22, 1993

[51] Int. Cl.⁶ .............................................. A01K 5/00
[52] U.S. Cl. ...................................... 119/52.4; 119/54
[58] Field of Search ................... 119/52.4, 53, 53.5, 119/54, 59

[56] References Cited

U.S. PATENT DOCUMENTS

| | | | |
|---|---|---|---|
| 1,695,597 | 12/1928 | Lydon . | |
| 1,822,302 | 9/1931 | McCollough | 119/52.4 |
| 2,426,696 | 9/1947 | Kwash | 119/52.4 |
| 2,512,260 | 6/1950 | Powell . | |
| 2,544,578 | 3/1951 | Winkler | 119/54 |
| 2,644,425 | 7/1953 | Hazen . | |
| 2,653,571 | 9/1953 | Pax | 119/53.5 |
| 2,988,047 | 6/1961 | Hurdle | 119/52.4 |
| 4,246,678 | 1/1981 | Cunningham | 119/54 |
| 4,353,329 | 10/1982 | Thibault . | |
| 4,401,057 | 8/1983 | Van Gilst . | |
| 4,444,151 | 4/1984 | Bohlmann | 119/54 |
| 4,462,338 | 7/1984 | Thibault . | |
| 4,601,414 | 7/1986 | Lawson . | |
| 4,676,197 | 6/1987 | Hoover . | |
| 4,719,875 | 1/1988 | Van Gilst . | |
| 4,729,344 | 3/1988 | Winkel . | |
| 4,799,455 | 1/1989 | O'Kelly | 119/54 |
| 5,044,318 | 9/1991 | Sutton et al. . | |
| 5,069,164 | 12/1991 | Wiwi . | |

FOREIGN PATENT DOCUMENTS 201365  8/1923  United Kingdom ................. 119/53

Primary Examiner—Todd E. Manahan
Attorney, Agent, or Firm—Dorsey & Whitney

[57] ABSTRACT

An improved gravity flow livestock feeder broadly includes a hopper, a base, an feeder assembly and a deflector. The feeder assembly includes an upright member and a plurality of arms pivotally and independently connected to the lower end of the upright member. Each arm extends radially from the upright member. The deflector is disposed within the interior of the hopper and is pivotally connected to the upper end of the upright member. The feeding actions of an animal against an arm facilitates the movement of feed to an area accessible to the feeding animal.

16 Claims, 5 Drawing Sheets

LIVESTOCK FEEDER

TECHNICAL FIELD

The present invention relates to livestock feeders in which feed is stored in a hopper and dispensed into a feed trough by a combination of gravity and the actions of a feeding animal.

BACKGROUND OF INVENTION

Gravity flow or gravity induced livestock feeders have been used on farms and ranches for many years. Such feeders typically include a base member that serves as a feed trough, a hopper for storing and dispensing feed to the trough, and an animal actuated element or elements that agitate the feed when moved by a feeding animal. Some of these feeders also include a baffle within the hopper to control the flow of the feed. Animal actuated elements may facilitate the movement of feed to a location accessible to the feeding animal or prevent the bridging or caking of feed in or around the hopper or both. U.S. Pat. Nos. 2,644,425 and 4,353,329 are examples of feeders that incorporate a base feeding trough, hopper, and animal actuated elements.

U.S. Pat. No. 4,462,338 discloses a livestock feeder including a trough, hopper, feed wheel and deflector. The feed wheel is rotatable by feeding animals and includes an upright member extending through the hopper bottom aperture and a feed sweep connected to the upright member that facilitates the downward flow of feed. The generally conical deflector is positioned within the hopper above hopper bottom aperture. The deflector serves to (1) create an angle greater than the feed angle of repose created by the hopper side wall thereby minimizing adhesion of feed to the hopper side wall; (2) support most of the weight of the feed in the hopper that would otherwise be directed to the hopper bottom aperture; and (3) provide a mechanism for adjusting the feed flow rate.

U.S. Pat. No. 4,601,414 discloses a flow enhancement device for suspension in storage bins. The device includes an upper frusto conical portion and a lower cylindrical portion having a plurality of fins extending outwardly from the cylindrical portion. The device is suspended within a storage bin by three lines attached to the upper portion of the storage bin. In use, the flow enhancement device directs material flow and occasionally agitates material to provide uniform material flow.

U.S. Pat. No. 5,044,318 discloses a hog feeder having a base with an elevated central plateau which is turned down at a predetermined point into a circumferential inner wall and then outwardly into a circumferential bottom or trough. Individual feeding vanes are positioned on the plateau and are actuated by hogs feeding from the trough. Movement of a vane works the feed across the plateau radially causing feed to fall from the plateau edge down onto the trough.

In known livestock feeders the base member or trough often includes a stepped or inclined bottom. U.S. Pat. No. 4,401,057 discloses a hog feeding system having an immobile pan with a stepped bottom defining two distinct feeding areas (wet and dry). U.S. Pat. No. 2,512,260 discloses a stock feeding apparatus having agitating elements resting on a feed trough having an integral upwardly tapered conical feed distributor in the center of the feed trough.

While the above-cited patents show improvements and advances in gravity induced livestock feeders, there are some inadequately addressed problems. First, the quantity of feed available to the animals is difficult to control resulting in either wasted feed or a lack of feed which reduces weight gain by the animals.

Another problem associated with known gravity induced livestock feeders is that they include feed openings that may be restricted to reduce wastage. When the feed openings are restricted the feed will frequently stop flowing because: (1) the weight of the feed in the hopper packs the feed causing it to bridge; (2) moisture from the animals feeding or from rain soaks into the feed causing the feed to cake; (3) changes in humidity causes the feed flow characteristics to change; and (4) changes in feed formulation changes flow characteristics.

Still another problem with some known gravity induced livestock feeders is that they require mechanical adjustments to control the flow of feed.

Yet another problem is that, while agitators actuated by the animals to reduce feed from plugging may solve feed stoppage problems, these agitators also may encourage excess feeding.

Another problem is that it is common for animals to waste feed by spilling it out of the feed area or by getting dirt or manure in the feed area.

Still another problem is that aggressive animals are able to interfere with other feeding animals.

Additional concerns involve livestock feeders that use a wheel type structure that the animals rotate or oscillate with their noses when feeding. Feeders using wheel type structure are complicated and expensive.

Clearly, there is a need for an efficient, durable, economical gravity flow livestock feeder that provides the proper quantity of feed, minimizes blockage problems and protects the feed from contamination.

SUMMARY OF THE INVENTION

The present invention provides a gravity flow livestock feeder including a hopper, a base, a feeder assembly and a deflector. The hopper includes a bottom aperture and is supported above the base. The base includes a bottom plate, an outer retaining wall, a top plate and a barrier wall. The outer portion of the bottom plate, outer retaining wall, openings in the top plate and barrier wall form a feed trough.

The feeder assembly includes an upright member and a plurality of arms pivotally and independently connected to the upright member. Each arm extends radially from the upright member and terminates at a point adjacent the outer retaining wall. The arms are supported by the base.

The deflector is positioned within the interior to the hopper and is pivotally connected the top end of the upright member. The deflector is generally wedge shaped and may be rotatably as well as pivotally connected to the upright member.

It is an object of the present invention to provide a livestock feeder that minimizes waste yet provides sufficient feed for livestock.

It is another object of the present invention to provide a gravity induced livestock feeder that prevents feed blockages caused by bridging, moisture, humidity or changes in feed formulation.

Still another object of the present invention is to provide an improved livestock feeder with animal actuated agitators that discourages excess feeding.

It is another object of the present invention to minimize or eliminate the mechanical adjustments required for proper operation thereby reducing maintenance.

Yet another object of the present invention is to provide an improved livestock feeder that provides a feeding trough that eliminates spilling and protects against contamination of the feed. A related object of the present invention is to provide a livestock feeder that reduces the animals' aggression while feeding.

It is another object of the present invention to provide a livestock feeder that is simple, economical and durable.

Other objects and advantages of the present invention will become more fully apparent and understood with reference to the following specification and to the appended drawings and claims.

DETAILED DESCRIPTION OF THE PREFERRED EMBODIMENT

Figure 1:
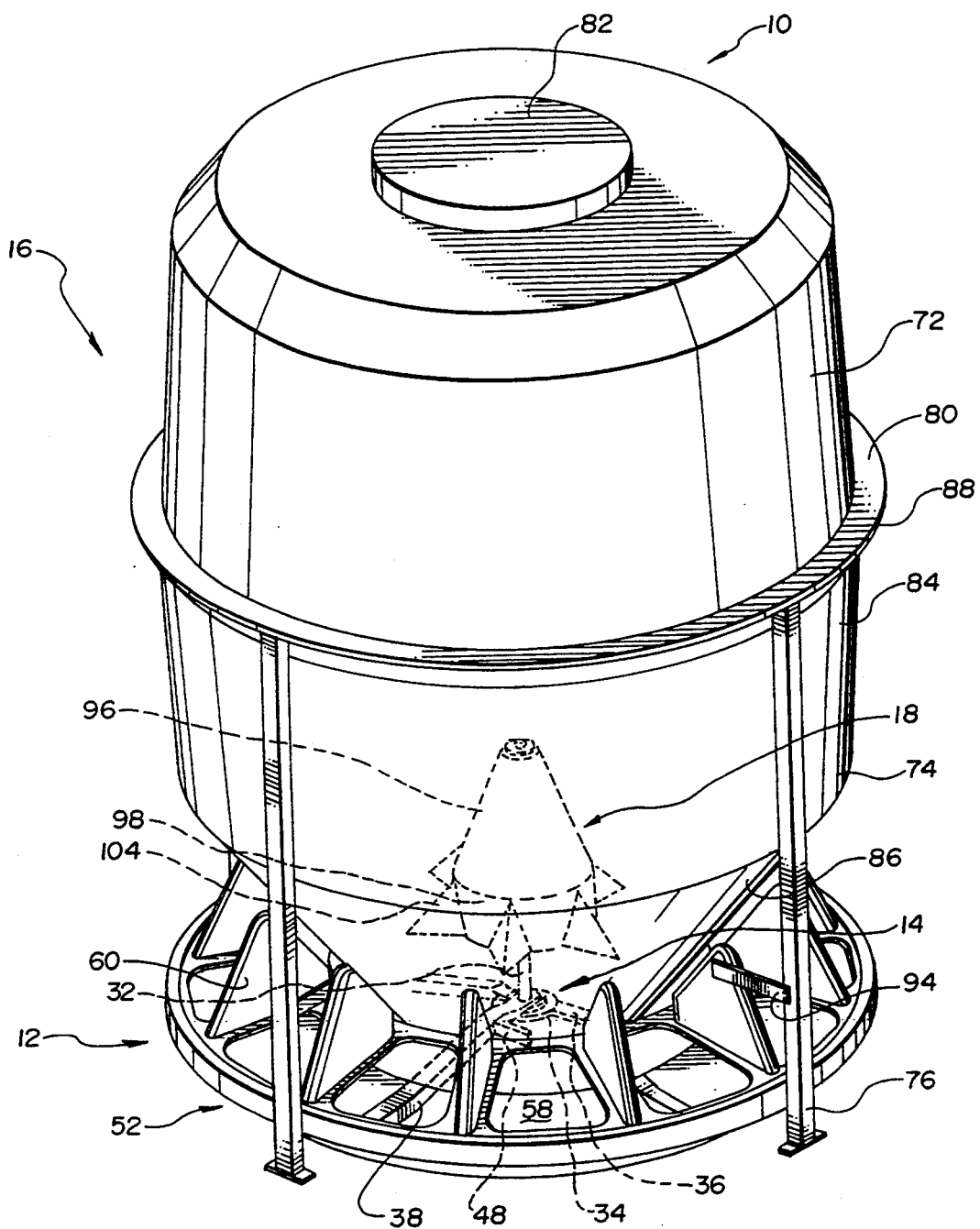
FIG. 1 is a perspective view of the livestock feeder of present invention depicting certain elements hidden from view in phantom.

The improved livestock feeder 10 of the present invention is depicted in FIG. 1. The feeder 10 broadly includes a base 12, a feeder assembly 14, a hopper 16 and a deflector 18.

Figure 4:
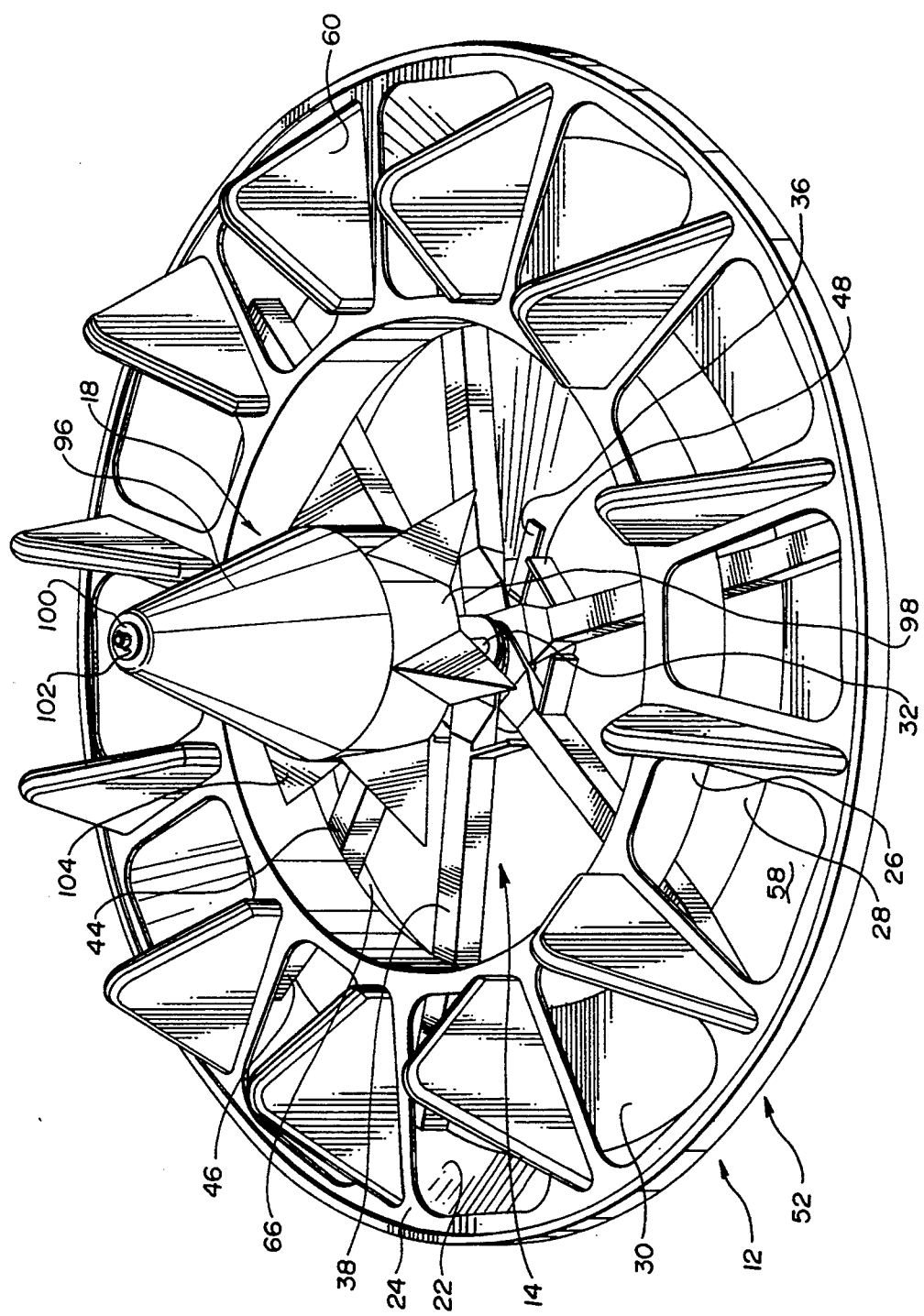
FIG. 4 is a perspective view of the present invention with the hopper removed.
Figure 5:
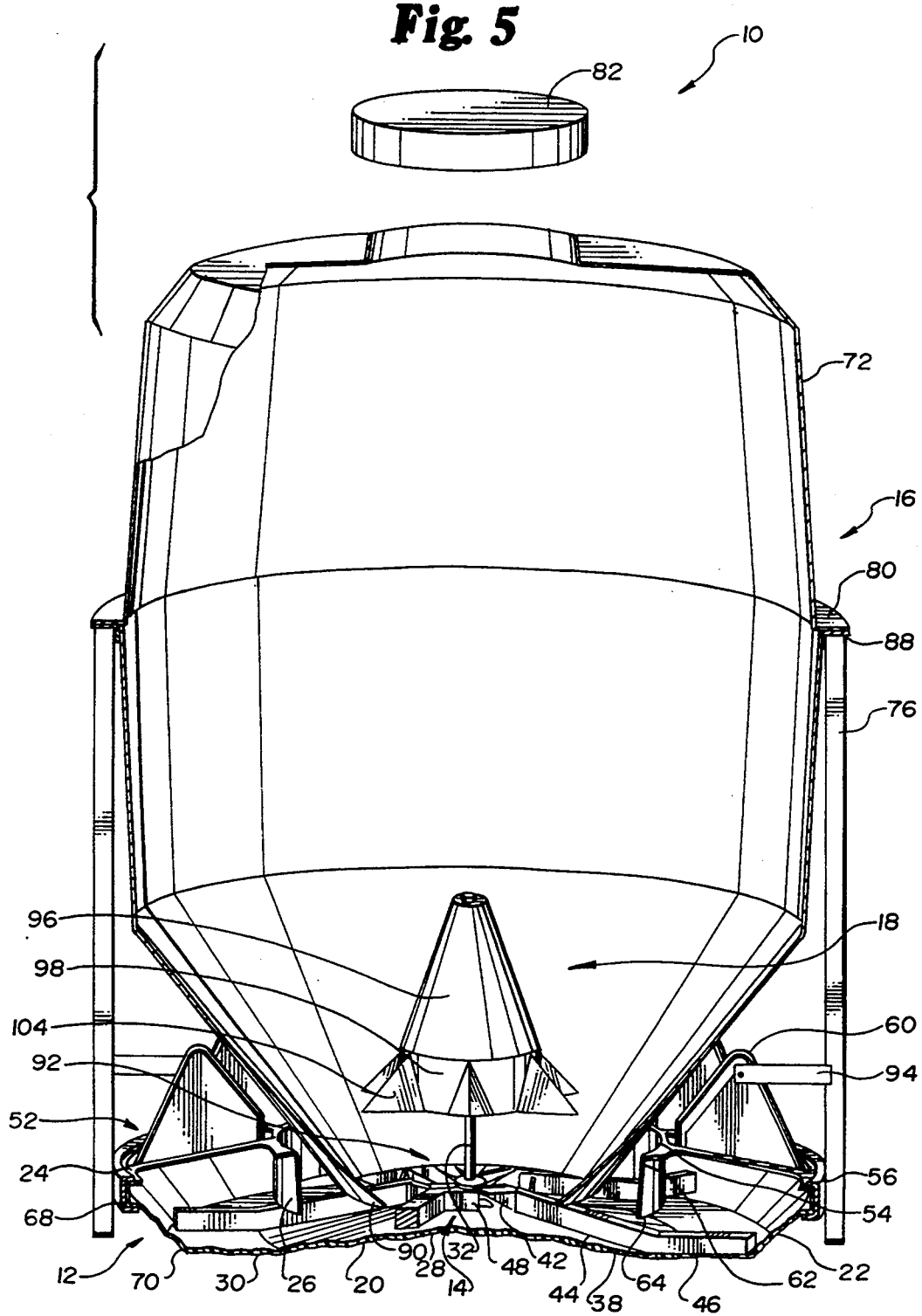
FIG. 5 is a cut away, sectional, perspective side view of the present invention.

As depicted in FIGS. 4 and 5, the base 12 includes a circular shaped bottom plate 20, annular shaped outer inclined side wall 22, annular shaped top plate 24 and annular shaped barrier wall 26. The bottom plate 20 has an inclined ramp section 28 and trough section 30. The ramp section 28 is raised above the trough section 30 such that the ramp section 28 gradually rises from the circumferential line of demarcation between the trough section 30 and the ramp section 28 to an area adjacent the center of the ramp section 28 of the bottom plate 20.

With further reference to FIGS. 4 and 5, the feeder assembly 14 includes a shaft 32, mounting plate 34, stop 36 and five feeder arms 38. One end of the solid, cylindrical shaft 32 is attached to the mounting plate 34. The mounting plate 34 is attached to the center of the bottom plate 20 such that the axis of the shaft 32 passes through the center point of the bottom plate 20. The mounting plate 34 is attached to the bottom plate 20 by four carriage bolts 35 that pass through four holes in the mounting plate 34, bottom plate 20 and a stabilizing plate 37 and are retained by four nuts 39 that tightened against the stabilizing plate 37. The stop 36 is attached to the mounting plate 34 and extends radially away from the mounting plate 34 at an angle perpendicular to the shaft 32. Like the mounting plate 34, one side of the stop 36 is flush with the bottom plate 20 of the base 12.

Figure 2:
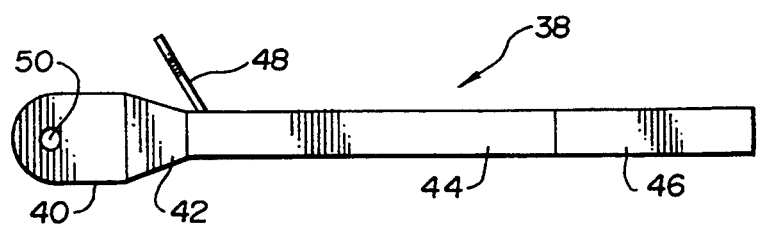
FIG. 2 is a top view of a feeder arm of the present invention.
Figure 3:
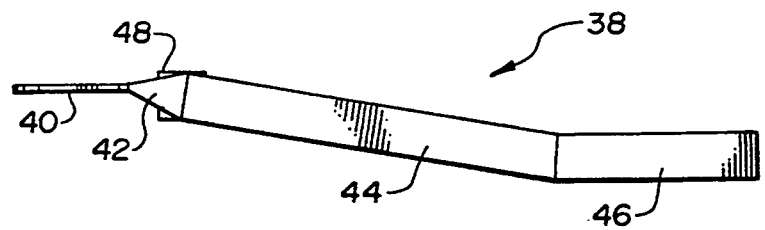
FIG. 3 is a side view of the feeder arm shown in FIG. 2 of the present invention.

The feeder arms 38 are substantially rectangular tubes that are pivotally mounted on shaft 32 in a stacked manner as best seen in FIG. 4. Five feeder arms 38 are provided. Each feeder arm 38 has a connector plate section 40, transition flange sections 42, a ramp tube section 44, a trough tube section 46 and a spacer arm 48. The connector plate section 40, transition flange sections 42, ramp tube section 44 and trough tube section 46 are of continuous construction. As depicted in FIGS. 2 and 3, each connector plate section 40 has an aperture 50 and is connected to transition flange sections 42. With continued reference to FIGS. 2 and 3, each set of transition flange sections 42 is connected to a ramp tube section 44 and each ramp tube section 44 is connected to a trough tube section 46. A spacer arm 48 is attached by welding, or the like, to each ramp tube section 44 adjacent a transition flange section 42. The spacer arm 48 is the same width as the depth of the ramp tube section 44 to which it is attached and is angled toward the connector plate section 40.

Referring to FIG. 5, a feeding trough 52 is formed by the barrier wall 26, top plate 24, outer inclined side wall 22, trough section 30 and a small portion of the ramp section 28 of the bottom plate 20. Referring to FIGS. 4 and 5, the top plate 24 has an inner edge 54 and outer edge 56, includes twelve feed openings 58 and supports twelve shield dividers 60 between each feed opening 58. The barrier wall 26 has a top edge 62 and a distal edge 64. The top edge 62 of the barrier wall 26 is attached to the inner edge 54 of the top plate 24. The distal edge 64 of the barrier wall 26 is adjacent and spaced from the ramp section 28 of the bottom plate 20 forming an annular gap 66 between the distal edge 64 of barrier wall 26 and bottom plate 20 as best depicted in FIG. 4. The height of the annular gap 66 is slightly greater than the depth of a ramp tube section 44 of a feeder arm 38.

The outer inclined side wall 22 has a lip edge 68 and a bottom edge 70. The bottom edge 70 is attached to the outermost edge of the bottom plate 20. The lip edge 68 is attached to the outer edge 56 of the top plate 24. The outer inclined side wall 22 opposes the barrier wall 26. The barrier wall 26 is substantially perpendicular to the plane of the trough section 30 of the bottom plate 20. The outer inclined side wall 22 angles away from the trough section 30 at an angle of approximately 135 degrees.

The hopper 16 includes a hopper top section 72, hopper bottom section 74 and four support legs 76. The hopper top section 72 is substantially cylindrical and includes an aperture 78 and an annular flange 80. The top aperture 78 is covered by a hopper lid 82. The hopper bottom section 74 consists of two sub-sections; a middle sub-section 84 and a converging frusto-conical funnel sub-section 86. The middle sub-section 84 of the hopper 16 is adjacent the hopper top section 72, is substantially the same size and shape as the hopper top section 72 and includes an annular flange 88. The middle sub-section 84 of the hopper bottom section 74 and the hopper top section 72 are connected at annular flange 88 and annular flange 80.

Figure 6:
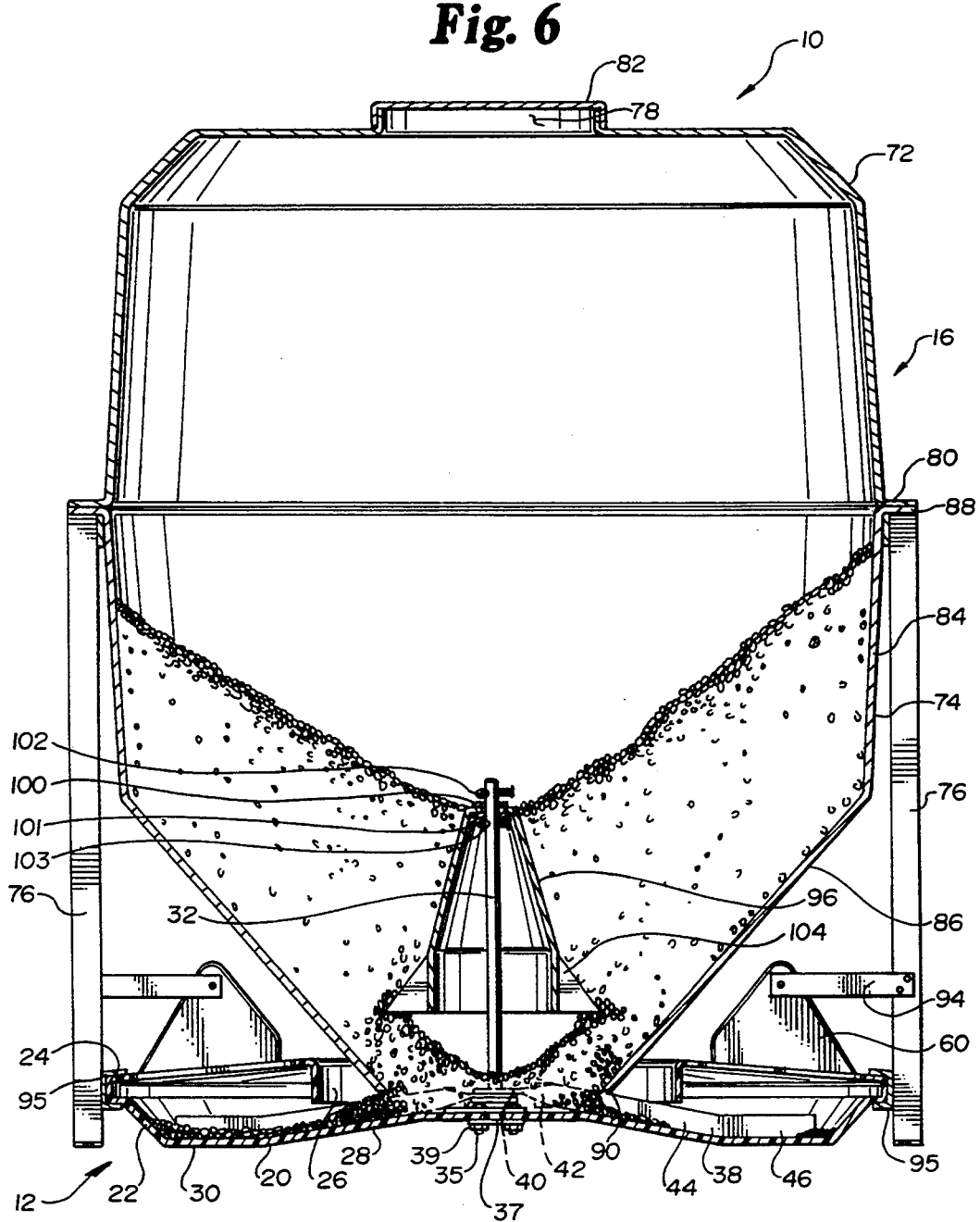
FIG. 6 is an axial sectional view of the present invention showing the feed flow path and the mounting of the deflector of the present invention.

The circumference of the funnel sub-section 86 of the hopper bottom section 74 is progressively reduced from the middle sub-section 84 of the hopper bottom 74 to the lower end of the hopper 16 where terminal edge 90 of the funnel sub-section 86 forms a circular bottom aperture, indicated generally at 92. The hopper 16 is supported above the bottom plate 20 by the four legs 76 spaced at equidistances around the hopper 16 and attached to annular flange 88 so that the bottom is slightly above the height of the ramp tube sections 44 of the feeder arms 38. The center of the bottom aperture 92 is positioned substantially over the center of the bottom plate 20 by a band 95 that is attached to the support legs 76 and that encompasses the outer edge 56 of the top plate 24 and the lip edge 68 of the outer inclined side wall 22 as depicted in FIG. 6. The shield dividers 60 and barrier wall 26 are stabilized by bracket 94 attached perpendicularly to each support leg 76 and to an adjacent shield divider 60.

Referring to FIG. 4, the deflector 18 includes a frusto-conical portion 96, and a cylindrical portion 98. The deflector 18 is rotatably and pivotally connected to the shaft 32 as shown in FIG. 6. An aperture where the deflector 18 is pivotally attached to the shaft 32 is at the peak of the frusto-conical portion 96. Referring to FIG. 6, the deflector 18 is connected to the shaft 32 by two washers, 100, 101, respectively, and two cotter pins, 102, 103, respectively. The base of the frusto-conical portion 96 is attached to the cylindrical portion 98. Eight knife-edged teeth 104 are equidistantly spaced around the exterior of the cylindrical portion 98.

With continued reference to FIG. 6, to prepare the livestock feeder 10 for use, the hopper lid 82 is removed and the hopper 16 is filled with feed through the aperture 78. The feed flows by gravity through the bottom aperture 92 to the bottom plate 20. Feed continues to flow out of the hopper 16 through the bottom aperture 92 and onto the bottom plate 20 until reaching the angle of repose of the feed as depicted on the bottom, right side of FIG. 6. The distance between the bottom aperture 92 and the bottom plate 20, the angle of decline of the ramp section 28 to the trough section 30, and the distance between the terminal edge 90 of the funnel sub-section 86 of the hopper 16 adjacent the bottom aperture 92 and the barrier wall 26 are such that, regardless of the feed type, the feed will not flow down the ramp section 28 to a point beyond the barrier wall 26.

Initially, a certain amount of feed must be placed in the feeding trough 52 to initiate feeding by the animals. In normal use, the animals will feed until there is negligible feed left in the feeding trough 52. The animals will then move the feeder arms 38 as they seek out the last feed. Movement of the feeder arms 38 across the bottom plate 20 causes feed behind the barrier wall 26 to roll or slide down the ramp section 28 of the bottom plate 20 into the trough section 30 where it is then available to the animals as depicted on the bottom, left side of FIG. 6. Conversely, if there is a significant amount of feed in the trough section 30, the feeder arms 38 are difficult for the animals to move because of the resistance caused by the volume of feed thereby preventing additional feed from being introduced into the trough section 30. One feeder arm 38 for approximately every other feed opening 58 also prevents active animals from introducing an excessive amount of feed into the trough section 30.

The feeder arms 38 pivot independently through a moderate arc, the degree of arc being limited by the spacer arm 48 attached to each feeder arm 38. The spacer arms 48 keep the feeder arms 38 apart an appropriate distance to insure feed will be biased into the trough section 30 below each feed opening 58 when needed and to prevent the feeder arms 38 from becoming wedged together adjacent the shaft 32. By being independently attached to the shaft 32, disablement of one feeder arm 38 will not impede or prevent activation of the remaining feeder arms 38 by the animals (e.g. a feed arm becomes frozen in wet feed).

The shield dividers 60 between the feed openings 58 limit the animals ability to see each other. Because the animals are segregated visually from each other, aggression at the livestock feeder 10 of the present invention is substantially reduced. Reduced aggression during feeding increases the efficiency of the feeding process. The shield dividers 60 also functions as a barrier to prevent an animal from backing up to the feeding trough and contaminating the feed.

During use, feed in the hopper 16 may begin to bridge in the funnel sub-section 86 of the hopper 16 which will prevent feed from flowing onto the bottom plate 20. Bridging between the side of the funnel sub-section 86 of the hopper 16 and the deflector 18 creates an unbalanced force that causes the deflector 18 to pivot away from the bridging feed. This action, aided by the knife-edged teeth 104, breaks up the bridged feed and allows the feed to continue to flow without interruption.

Polyethylene is the preferred material for forming the base 12, hopper 16, and deflector 18, and steel is the preferred material for forming the remaining elements of the present invention, but any suitable material, e.g., aluminum, could be used as long as it is sufficiently rigid and durable.

Although a description of the preferred embodiment has been presented, it is contemplated that various changes, including those mentioned above, could be made without deviating from the spirit of the present invention. It is therefore desired that the present embodiment be considered in all respects as illustrative, not restrictive, and that reference be made to the appended claims rather than to the foregoing description to indicate the scope of the invention.

I claim:

1. An animal actuated, gravity induced feeder, comprising:
   a. a feed hopper with a circular bottom aperture disposed substantially in a horizontal plane;
   b. a frusto-conical baffle pivotally mounted on a vertical axis with its major diameter above and in proximity to the bottom aperture, substantially concentrically therewith;
   c. a plurality of feeding stations disposed in a substantially horizontal plane substantially concentrically and circumferentially spaced below and outwardly from the bottom aperture;
   d. a support surface disposed beneath the bottom aperture at a distance from the bottom aperture whereby feed is deposited upon the support surface but does not flow into the area of said feeding stations, said support surface extending radially outwardly from said vertical axis to said feeding stations at an angle below a horizontal plane less than the angle of repose of the feed; and
   e. a plurality of independently movable elongated feeder arms pivotally mounted beneath the bottom aperture and extending from the support surface to the feeding stations, resting upon the support surface and feeding stations such that movement of the feeder arms by the animal causes feed to flow from said support surface to the feeding stations.

2. The apparatus according to claim 1, wherein the feeder arms are mounted in an array substantially centered about the center of the support surface.

3. The apparatus according to claim 1, wherein said baffle is pivotally mounted on a vertically extending shaft, said shaft being mounted on the center of and extending upwardly from said support surface.

4. The apparatus according to claim 3, wherein the feeder arms are independently connected to said shaft whereby each said feeder arm rests upon the support surface and the bottom plate.

5. An animal actuated, gravity induced feeder, comprising:
   a. a feed hopper with a circular bottom aperture disposed substantially in a horizontal plane;
   b. a frusto-conical baffle pivotally mounted on a vertical axis with its major diameter above and in proximity to the bottom aperture, substantially concentrically therewith;
   c. a plurality of feeding stations disposed in a substantially horizontal plane substantially concentrically and circumferentially spaced below and outwardly from the bottom aperture;
   d. a support surface disposed beneath the bottom aperture at a distance from the bottom aperture whereby feed is deposited upon the support surface but does not flow into the area of said feeding stations, said support surface being conical and extending radially outwardly from said vertical axis and sloping downwardly to said feeding stations at an angle less than the angle of repose of the feed; and
   e. a plurality of independently movable elongated feeder arms, pivotally and concentrically mounted beneath the bottom aperture and extending from the support surface to the feeding stations, resting upon the support surface and feeding stations such that movement of the feeder arms by the animal causes feed to flow down said support surface to the feeding stations.

6. The apparatus according to claim 5, wherein the feeding stations are defined by a barrier wall, a top plate, a side wall, a bottom plate, and a portion of the conical support surface, said top plate having a plurality of feed openings.

7. The apparatus according to claim 6, wherein a divider is attached to the top plate between each said feed opening, and each said divider is substantially perpendicular to the top plate.

8. The apparatus according to claim 6, wherein the circumference of said hopper adjacent the feeding stations is encompassed by the barrier wall.

9. The apparatus according to claim 8, wherein the hopper is connected to the feeding stations and supported above the support surface by a plurality of legs.

10. The apparatus according to claim 6, wherein more than one-half the total height of the hopper has a circumference generally equal to the circumference of the feeding stations.

11. The apparatus according to claim 10, wherein the section of the hopper adjacent the feeding stations is funnel shaped and the circumference of the bottom aperture is less than the circumference of the barrier wall.

12. The apparatus according to claim 6, wherein the number of said feeder arms is about one-half the number of said feed openings.

13. The apparatus according to claim 6, wherein said baffle is pivotally mounted on a vertically extending shaft, said shaft being mounted on the center of and extending upwardly from said support surface.

14. The apparatus according to claim 13, wherein the feeder arms are independently connected to said shaft whereby each said feeder arm rests upon the conical support surface and the bottom plate.

15. The apparatus according to claim 13, wherein each said feeder arm includes a spacer means adjacent said shaft for contacting an adjacent said feeder arm thereby limiting the range of travel of each said feeder arm.

16. The apparatus according to claim 15, wherein a stop is attached to the shaft adjacent the conical support surface, said stop is substantially perpendicular to the shaft and is in the line of travel of one of the spacer means.

* * * * *